United States Patent [19]

Meshberg

[11] Patent Number: 5,667,104
[45] Date of Patent: Sep. 16, 1997

[54] DIRECTIONAL DISPENSER AND METHOD OF ITS USE

[76] Inventor: Philip Meshberg, 2770 S. Ocean Blvd., Apartment 602, Palm Beach, Fla. 33480

[21] Appl. No.: 305,637

[22] Filed: Sep. 14, 1994

Related U.S. Application Data

[63] Continuation-in-part of Ser. No. 163,787, Dec. 9, 1993, and a continuation-in-part of Ser. No. 222,975, Apr. 5, 1994, Pat. No. 5,460,207, which is a division of Ser. No. 887,032, May 22, 1992, Pat. No. 5,305,810.

[51] Int. Cl.$^6$ .............. B05B 11/00; G01F 11/00
[52] U.S. Cl. .............. 222/143; 53/133.2; 53/300; 53/470; 53/485; 222/321.9; 222/340; 222/382; 222/464.1
[58] Field of Search .............. 222/321.1, 321.7, 222/321.9, 153.11, 153.13, 143, 182, 382, 384, 385, 402.11, 340, 464.1; 53/79, 133.2, 300, 470, 471, 485, 486, 489

[56] References Cited

U.S. PATENT DOCUMENTS

| | | | |
|---|---|---|---|
| 2,799,435 | 7/1957 | Abplanalp | 222/394 |
| 2,835,418 | 5/1958 | Manetti | 222/402.13 X |
| 2,973,114 | 2/1961 | Patton | 222/143 X |
| 3,161,330 | 12/1964 | Sagarin et al. | 222/394 |
| 3,257,044 | 6/1966 | Seaquist | 222/143 X |
| 3,333,743 | 8/1967 | Meyers | 222/402.1 |
| 3,387,749 | 6/1968 | Godshalk et al. | 222/143 |
| 4,183,449 | 1/1980 | Blake. | |
| 4,277,001 | 7/1981 | Nozawa | 222/321 |
| 4,854,484 | 8/1989 | Gentile et al. | |
| 4,875,604 | 10/1989 | Czech. | |
| 4,993,606 | 2/1991 | Bolen, Jr. et al. | 222/546 |
| 5,024,355 | 6/1991 | Jouillat et al. | |
| 5,085,350 | 2/1992 | Sugita | 222/260 |
| 5,104,004 | 4/1992 | von Schuckmann. | |
| 5,123,573 | 6/1992 | Kücherer. | |
| 5,158,211 | 10/1992 | Meshberg. | |
| 5,263,606 | 11/1993 | Dutt et al. | |

FOREIGN PATENT DOCUMENTS

| | | | |
|---|---|---|---|
| 251 939 | 7/1987 | European Pat. Off. | |
| 2 522 283 | 9/1983 | France. | |
| 2 649 408 | 10/1990 | France. | |
| 3147749 | 6/1983 | Germany. | |
| 2013774 | 8/1979 | United Kingdom. | |
| 8905773 | 6/1989 | WIPO | 222/387 |

*Primary Examiner*—Kevin P. Shaver
*Attorney, Agent, or Firm*—Kenyon & Kenyon

[57] ABSTRACT

A directional dispensing package which is easily shipped, filled and assembled is disclosed. The package includes a retaining opening into which a modular pump is snap-fit by inserting the modular pump through an open end of the package. The package also includes a upstanding wall portion, which provides a dispensing actuator locking and sealing mechanism, as well as a tamper-evident tab. The package and pump are assembled at a production site, and are thereafter shipped to a filling site with a bottom portion. The package is filled through the open bottom end, and then the bottom portion is sealingly affixed to the package. The package may include an integrally-molded dip tube structure and a bottom portion with specific structure for allowing easy assembly while preventing leakage. Accordingly, the device of the present invention can be filled and finally assembled with a minimal number of steps, and is therefore particularly suited for quick-turnaround marketing.

40 Claims, 10 Drawing Sheets

DIRECTIONAL DISPENSER AND METHOD OF ITS USE

This application is a continuation-in-part of U.S. patent application Ser. Nos. 08/163,787, filed Dec. 9, 1993 (allowed) and 08/222,975, now U.S. Pat. No. 5,460,207, which application was filed Apr. 5, 1994 as a division of U.S. patent application Ser. No. 07/887,032, filed May 22, 1992, now U.S. Pat. No. 5,305,810.

BACKGROUND OF THE INVENTION

1. Field of the Invention

The present invention relates to a complete dispensing package designed to be shipped as an assembled unit to a liquid product marketer, for subsequent filling. The dispensing package is easily filled and bottom sealed with a minimal number of automatic assembly steps. The package of the present invention also includes structure to provide an air seal to the dispensing nozzle and lock the dispensing actuator when it is not in use, and provides a tamper-resistant package. The dispensing package further includes a bottom sealing mechanism adapted for easy assembly, effective sealing, and which allows stacking of the dispensing package upon another dispensing package. The dispensing package may include an integral dip tube, which allows for easy filling and assembly.

2. Description of the Related Art

U.S. Pat. No. 5,158,211 discloses a dispensing package including a modular pump which is assembled into a dispensing package using a snap fit, such that the dispensing pump is permanently retained in the package. In the device disclosed in U.S. Pat. No. 5,158,211, the package is filled through an opening at the top of the package. After filling, the pump is attached to the package, either by snap-fitting the pump structure into a retaining opening, or by adding the pump to the package using a conventional screw-cap mounting. Accordingly, in the device of U.S. Pat. No. 5,158,211, the assembled pump structure and the package must be shipped unassembled to a filling and assembly site, where the package is filled and the pump is then assembled to the package. The invention of U.S. Pat. No. 5,158,211 also includes a mechanism for sealing the outlet nozzle when the dispenser is not in use, and a mechanism for making the dispenser tamper-resistant, to thereby prevent placing any foreign substances or liquids into the package after it is sealed, and also to prevent accidental discharge of liquid.

U.S. Pat. No. 5,392,962, issued Feb. 28, 1995, the disclosure of which is incorporated herein by reference, discloses two designs of a pump which is constructed entirely of a plastic material, to make the pump easily recyclable.

SUMMARY OF THE INVENTION

The present invention is a package-dispensing unit combination designed for easy filling and post-filling assembly, and which can be efficiently shipped to a liquid product producer and to a post-filling marketer. The device of the present invention is especially suitable for promotional purposes, since the liquid product producer need only fill the package, snap on a bottom piece to the package, which may be labeled before or after the filling process. The device of the present invention is ideally suited for allowing directional dispensing of liquid products. The device is thus particularly suited to a quick-turnaround filling and marketing operation, and the assembled and filled packages can be shipped in the same cartons as the unfilled packages were shipped in to the liquid product producer. Accordingly, the present invention eliminates waste in carton usage, preventing the need to use different cartons for the containers, pumps and filled package.

In the present invention, a modular pump is permanently snap-fit or sonically welded in a leak-proof manner into an opening in a retaining wall in the top of the dispensing package, by inserting the pump into either the open bottom or the open top of the package. An actuator can then be assembled onto the package, which package can include a tamper-evidencing feature, as well structure for locking and sealing the outlet nozzle in a non-dispensing position when not in use. The package can then be shipped to a filling site or to a liquid product producer for filling, final assembly and labelling. At a filling site, the package is inverted, filled from the open bottom, and then a bottom piece is snapped in sealing engagement into the open bottom of the package. The bottom piece can optionally be ultrasonically welded, or sealed with an adhesive, to the package, in such a way that the bottom is permanently retained on the package in a leakproof manner.

The present invention also includes a mechanism for preventing tampering with the contents of the package after it is sealed, and for preventing accidental discharge of the liquid. This mechanism includes constructing the package so that it is completely sealed after filling. In addition, a snap-off tab is included near the actuator which indicates whether the actuator of the device has been used previously. Also, the device includes a limit stop for preventing actuation of the actuator when locked in a non-dispensing position.

The present invention can be constructed entirely of a plastic material, to make it particularly suitable to recycling. The package can include a spring located between the actuator and the retaining wall. This spring can be constructed of plastic—so that the entire package can be recycled as a unit—or can be constructed of metal—so that the metal spring can be removed from the package easily by simply dislodging the actuator. Both configurations of the present invention make the package easy to recycle.

The present invention can include a dip tube structure which is integrally molded with the package. This construction allows easy assembly and filling of the package, and makes the product especially useful in dispensing highly viscous products.

The present invention includes a specific structure for the bottom portion which is placed on the package after filling. The construction of this bottom portion allows the package to be easily assembled after filling, yet ensures proper sealing of the package against leakage. The bottom portion can be configured to allow easy stacking of the dispensing package.

BRIEF DESCRIPTION OF THE DRAWINGS

Other objects and advantages of the invention will be apparent from he specification and claims, when considered in connection with the attached sheets of drawings, illustrating one form of the invention, wherein like characters represent like parts and in which:

DETAILED DESCRIPTION OF THE INVENTION

Figure 1:
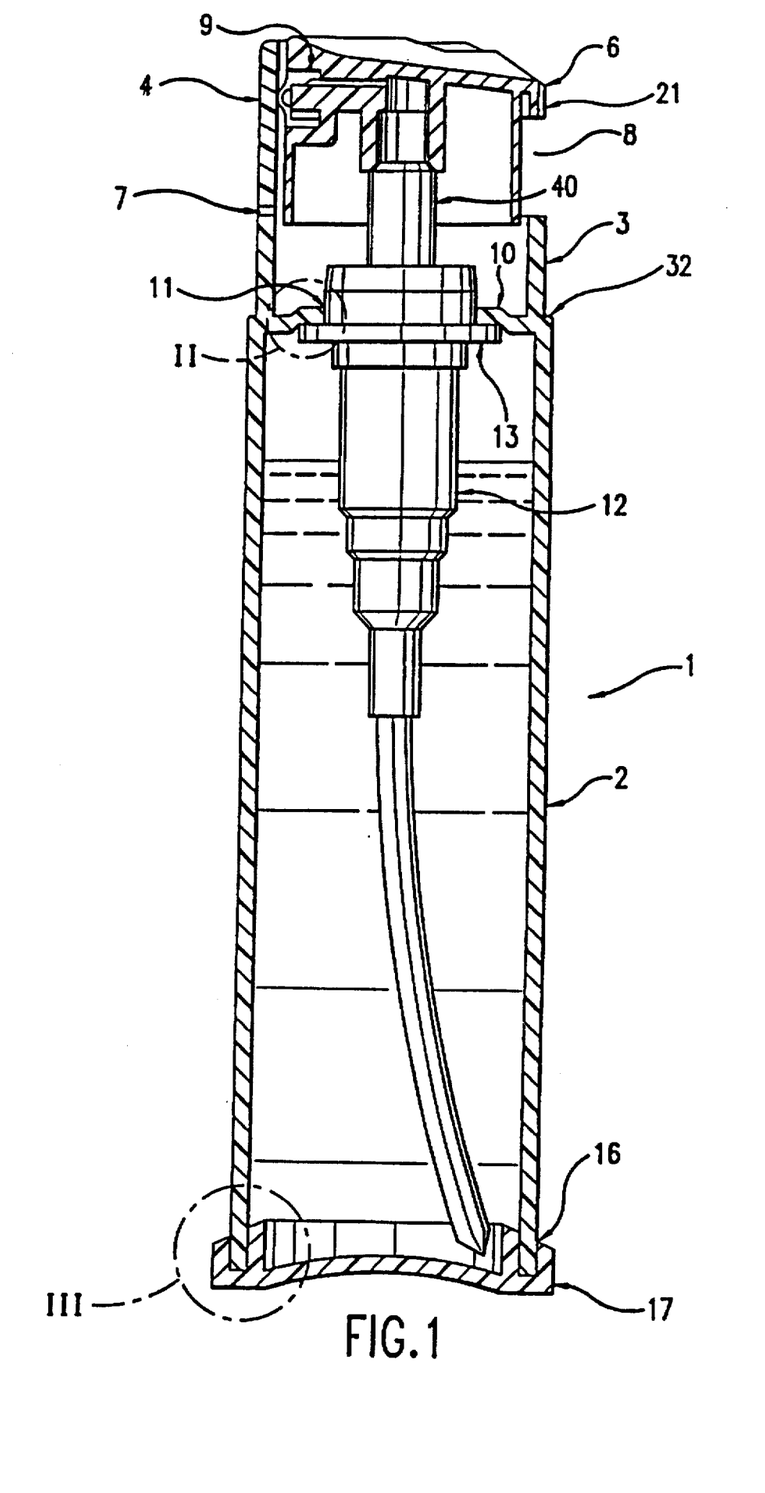
FIG. 1 is a cross-sectional view of the present invention, with the pump inserted and the bottom closure sealed.

The present invention is shown in cross-sectional view, in a sealed condition, in FIG. 1. The present invention includes a package 1 which includes a container portion 2 and an upstanding sleeve portion 3. Upstanding wall portion 3 includes a tamper evident tab portion 4, connected to the upstanding wall portion 3 by a snap-away or tear-away joint 7. Joint 7 is originally molded to integrally connect tab portion 4 to upstanding wall 3, but is designed to be of sufficient thinness so that an end user can ultimately break the joint 7 so that the tab portion 4 can be removed from sleeve portion 3 to uncover nozzle 9 on actuator 6 when it is desired to first use the dispenser 1. Upstanding wall 3 can include a recess 8 intended to facilitate movement of an actuator nozzle 9 within the upstanding wall 3. Although shown as being vertically oriented in FIG. 1, tab portion 4 could also be oriented in a horizontal direction, with the joint 7 being disposed vertically at one end of the tab 4.

Container portion 2 and upstanding wall 3 are separated by a retaining wall 10 which includes a retaining opening 11 used to secure a pump 12 in the package 1. Pump 12 can be of any conventional design. Pump 12 includes a retention flange 13 for limiting the amount of inward movement of the pump 12 into the container 1 and for providing a surface for an energy director 15 to adhere during a process of sonic or ultrasonic welding. Alternatively, pump could include a retention groove which retains the pump 12 in the package 1 via a snap-fit engagement with retaining wall 10. Pump 12 is inserted into retaining opening 11 through the lower end 16 of container portion 2 or from the upper end including the upstanding wall 3, which is initially open.

Figure 2A:
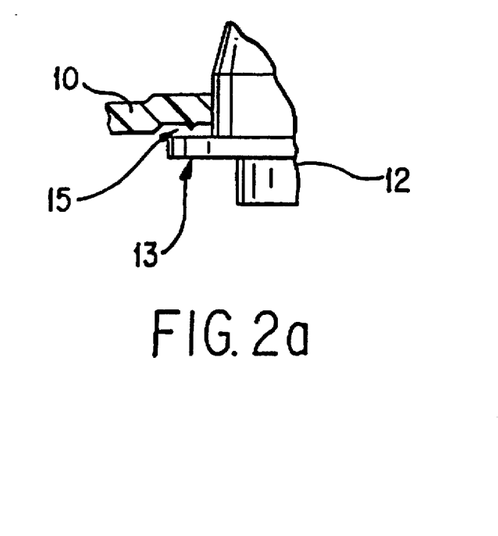
FIGS. 2a and 2b show detail cross-sectional views of the pump and retaining opening of the present invention, showing the energy director feature for sonic welding.
Figure 2B:
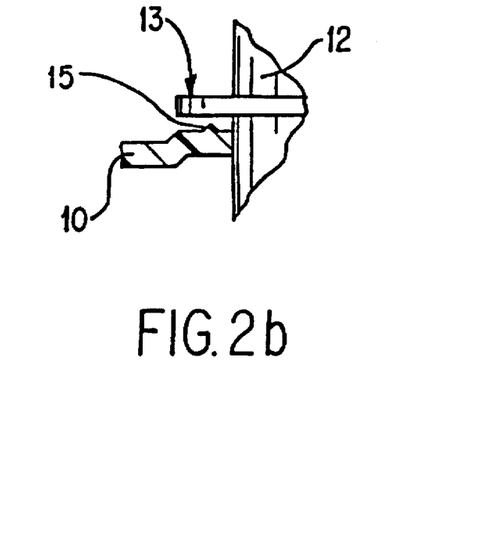

FIGS. 2a and 2b show detail views of the pump 12, pump flange 13, retaining wall 10 and energy director 15. Energy director 15 is a molded ridge which when excited by sonic or ultrasonic vibration of container 2 causes retaining wall 10 and flange 13 to weld together, thereby permanently retaining pump 12 in container portion 2 and sealing the upper end of the container portion 2.

Figure 3A:
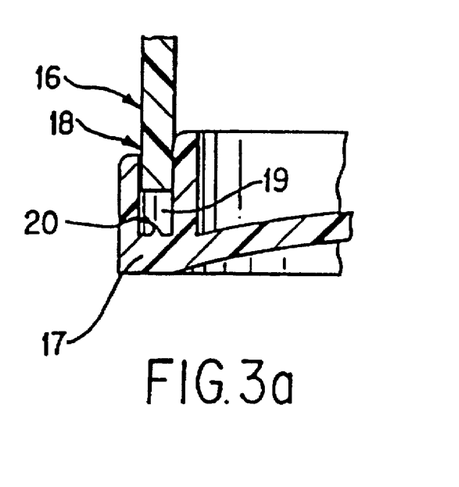
FIGS. 3a and 3b show a detail cross-sectional views of the lower end of the container and the bottom portion which is secured to the container of the present invention, showing the energy director feature.
Figure 3B:
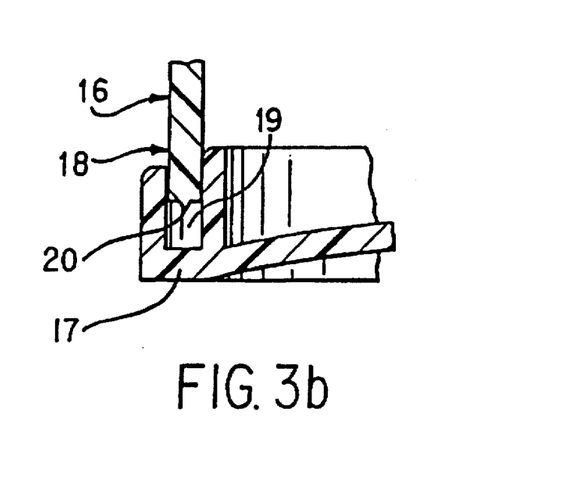

FIGS. 3a and 3b show detail views of the mechanism whereby a bottom portion 17 is attached to lower end 16 of container portion 2. Lower end 16 includes a tapered portion 18 which is shaped so as to fit into a retaining groove 19 in bottom portion 17. Retaining groove 19 or lower end 16 contains, at its lower end, an energy director 20 used to secure and seal bottom portion 17 to the lower end 16 of container portion 2. As with energy director 15, energy director 20 is a molded ridge which when excited by sonic or ultrasonic vibration of container 2 causes lower end 16 and bottom portion 17 to weld together, thereby permanently retaining bottom portion 17 on container portion 2 and sealing the lower end of the container portion 2.

Figure 4:
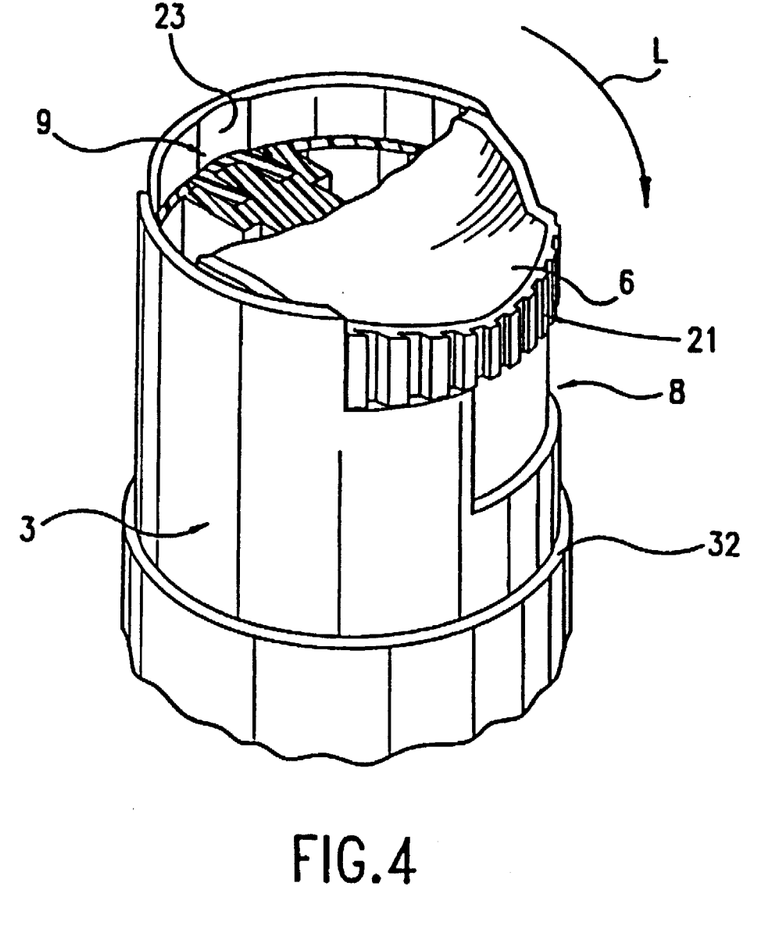
FIGS. 4–6 are perspective views of the actuator and locking mechanisms of the present invention, wherein FIG. 4 includes a partial cross-sectional view.
Figure 5:
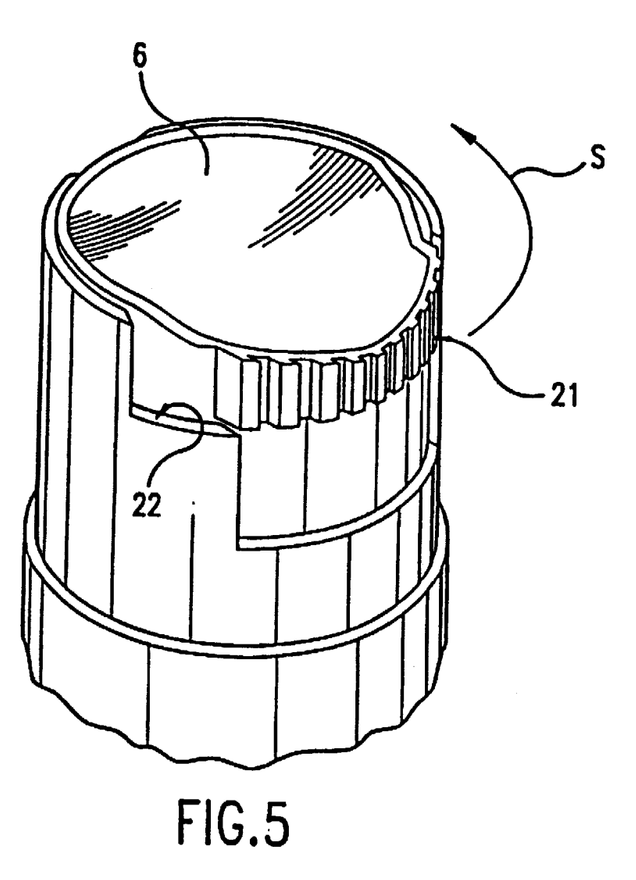
Figure 6:
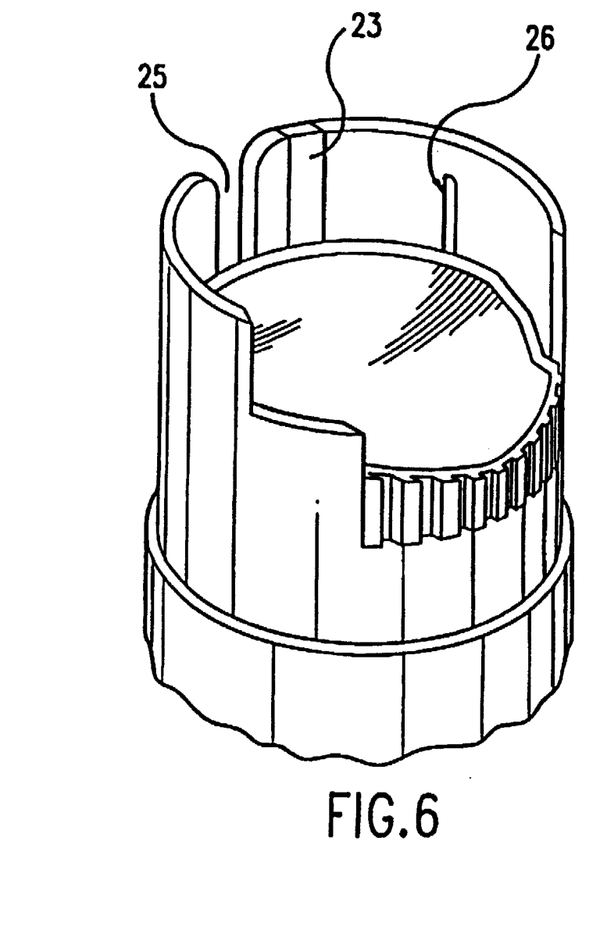

FIGS. 4–6 show the particular features of the actuator 6 of the present device, and the particular locking and retaining features of the upstanding wall 3. In FIG. 4, the forward portion of actuator 6 is shown in cross-sectional view, to show the manner in which the nozzle 9 is sealed in a non-dispensing position. Actuator 6 includes a projecting portion 21 which is used to rotate actuator 6 from a dispensing to a non-dispensing position, and which also acts to prevent downward movement of actuator 6 when actuator 6 is in a non-dispensing position. Upstanding wall 3 includes a limit stop 22 which prevents actuator 6 from moving downward—and thus dispensing material from pump 12—via engagement with limit stop 22 (See FIG. 4). The position of the actuator 6 shown in FIG. 4 is the position in which the actuator 6 is kept before the tab 4 is remove from upstanding wall 3. In this position, nozzle 9, which includes a slightly projecting tip, is snapped into a vertical groove 23. Groove 23 acts to retain nozzle 9 and actuator 6 in a non-dispensing position, and also seals the nozzle 9 against the incursion of air into the nozzle 9 orifice. Rotating actuator 6 in the direction indicated by arrow S places the actuator 6 and nozzle 9 into a spraying or dispensing position. In this position (shown in FIGS. 5 and 6) projecting portion 21 in alignment with recess 8. In this position, nozzle 9 is aligned with opening 25 which is formed when tab 4 is removed. As seen by comparing FIGS. 5 and 6, projecting portion 21 travels within recess 8 upon downward actuation of actuator 6, allowing dispensing of material through nozzle 9 via pump 12. Rotating actuator 6 in the direction indicated by arrow L into a locking position, in which nozzle 9 is snapped into groove 23. Indication that nozzle 9 is properly in a non-dispensing position can be provided via a bead 26, which can coact with a bead on the outer circumferential surface of actuator 6, thereby providing an audible "snapping" sound when the beads slide over one another.

Figure 7:
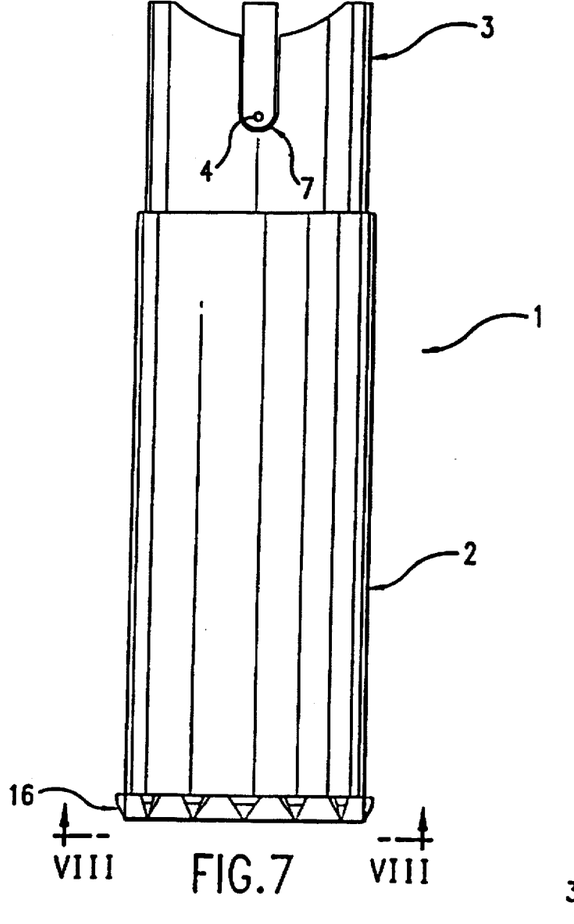
FIG. 7 shows a front view of the container of the present invention, including a second embodiment of the mechanism for attaching the bottom portion to the container.
Figure 8:
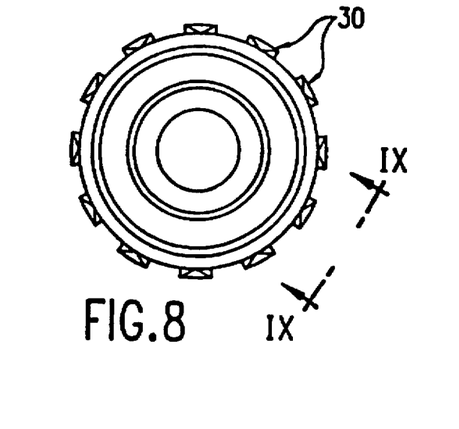
FIG. 8 is a bottom view of the container of FIG. 7.
Figure 9:
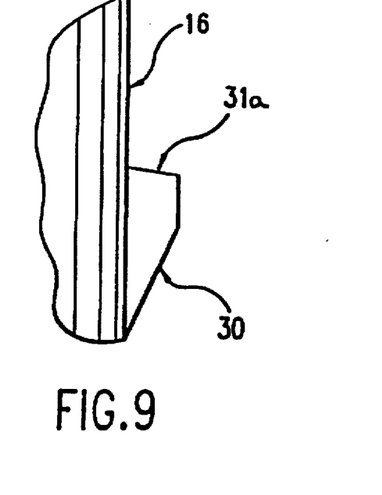
FIG. 9 is a detail view of the retaining mechanism of FIGS. 7–8.
Figure 10:
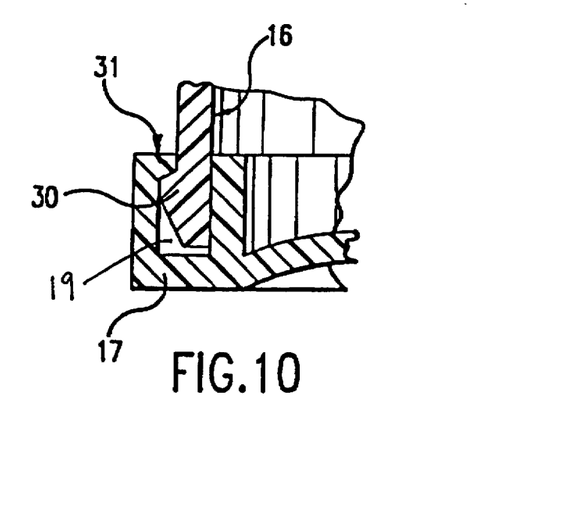
FIG. 10 is a detail cross-sectional view of the lower end of the container of FIGS. 7–9 and the bottom portion.

FIGS. 7 and 8 show a front and bottom view of the container portion 2 of the present invention, which includes a second embodiment of a mechanism for securing the bottom portion 17 to the container portion 2. Lower end 16 of container portion 2 contains a series of angled tabs 30. Angled tabs 30 are designed to fit into groove 19 in bottom portion 17. Upper end of angled tabs 30 include a generally horizontal surface 31 intended to snap into a horizontally projecting portion 31 on bottom portion 17. Angled tabs 30 and horizontal surface 31 allow bottom portion 17 to be secured horizontally to container portion 2 to thereby ensure good sealing of the bottom portion 17 to the container portion 2 through its entire periphery.

The transition area between container portion 2 and upstanding wall 3 can contain a shoulder 32. Shoulder 32 is useful for an assembly and filling operation of the present invention, as will be described below.

Figure 11:
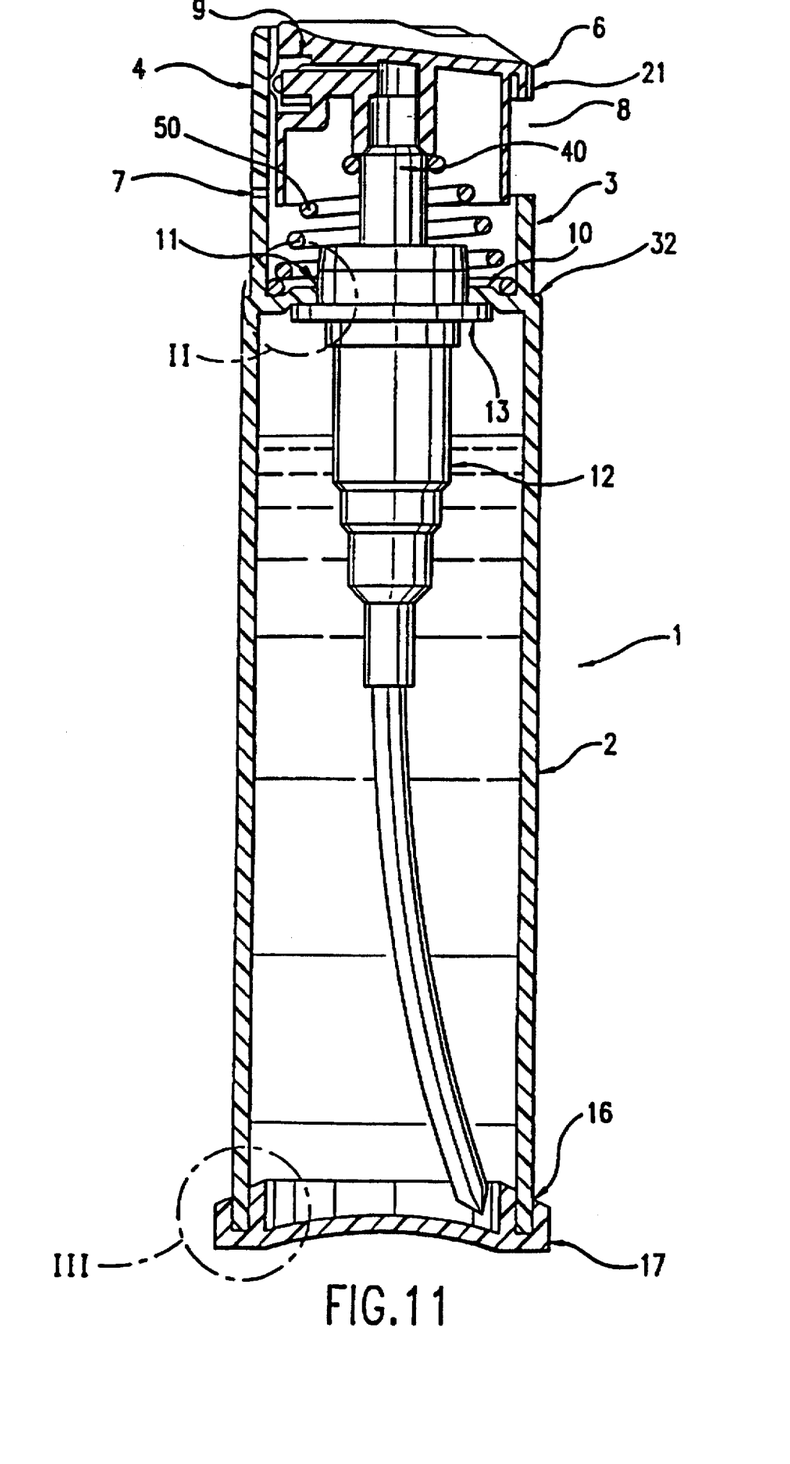
FIG. 11 is a cross-sectional view of an embodiment of the present invention using a spring between the actuator and the container, with the pump inserted and the bottom closure sealed.

As shown in FIG. 11, the pump spring 50 of the present invention can be located between the retaining wall 10 and the actuator 6, as described in U.S. Pat. No. 5,392,962, issue Feb. 28,1995, the substance of which is incorporated herein by reference. In the configuration of FIG. 11, the spring 50 can be made of a plastic material, making the entire package recyclable, or the spring 50 can be metallic. If the spring 50 is metallic, the package 1 is still easily recyclable, since the metallic spring 50 is easily removed from the package by simply dislodging the actuator 6 and removing the spring 50. The package 1 of the present invention may also be made of a biodegradable plastic material, so that it has less of an environmental impact.

The method of using the device of the present invention is as follows. The container portion 2 is molded as an integral unit with upstanding wall 3 and retaining wall 10. Container portion 2 is inverted, and preferably inserted into a holding or restraining mechanism which interacts with shoulder 32 to restrain container portion 2 in an inverted position. Next, pump 12 is inserted into either the open end of lower end 16 or upper end including upstanding wall 3 (as described, for example, in U.S. Pat. No. 5,158,211), so that the pump 12 fits through retaining opening 11 until flange 13 abuts retaining wall 10, or until the pump is press-fit into retaining opening 11. If retaining wall 10 contains an energy director 15, container portion 2 is sonically or ultrasonically excited so that energy director 15 welds retaining wall 10 and flange 13 in a sealing relation. Actuator 6 can then be inserted onto the outlet stem 40 of pump 12.

The container portion 2 thus assembled is shipped together with bottom portion 17 in an unassembled condition to a filling and assembly location. When it is desired to fill package 1, container portion 2 is again inverted, preferably by engaging shoulder 32 with a holding device. Container portion 2 is then filled with liquid product through open lower end 16. Bottom portion 17 is then placed on lower end 16. If bottom portion 17 contains an energy director 20, container portion 2 is sonically or ultrasonically excited so that energy director 20 welds bottom portion 17 and lower end 16 in a sealing relation. In the case of lower end 17 including angled tabs 30, bottom portion 17 is inserted onto lower end 16 until portion 31 snaps under angled tabs 30.

After bottom portion 17 is sealed to lower end 16, the package 1 can be labelled and shipped to an end user, or alternatively, package 1 can be labelled before the container portion 2 is shipped to the liquid product marketer. Upon receiving package 1, the customer breaks off tab 4, and then when dispensing is desired, rotates actuator 6 to the position shown in FIG. 5. Downward actuation of actuator 6 dispenses liquid product from package 1, through nozzle 9.

Figure 12:
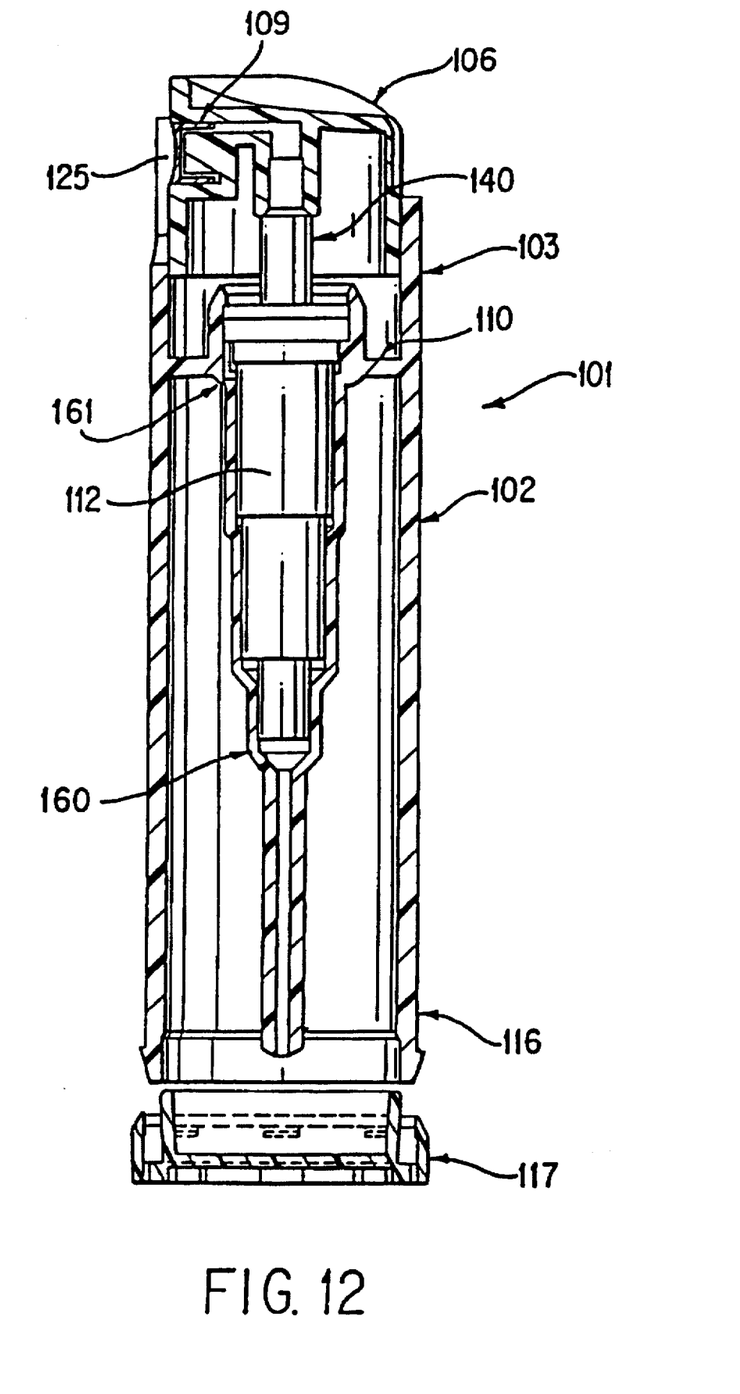
FIG. 12 is a cross-sectional view of the dispensing package of the present invention in which the dispensing package includes an integrally-molded dip tube structure.

FIG. 12 shows an embodiment of the present invention in which a dip tube structure 160 is integrally molded with container portion 102. In FIG. 12, features common to those in the embodiment of FIGS. 1–6 are labeled with like reference numerals, but with a "1" prefix (inter alia, opening 125, nozzle 109, actuator 106, outlet stem 140, upstanding wall 103, lower end 116). Retaining wall 110 in the embodiment of FIG. 12 is integrally molded with dip tube structure 160 to form a one-piece unit. Dip tube structure 160 includes a venting hole or slot 161, which allows air to escape from container during filling, when filling is accomplished through dip tube structure 160 after bottom portion 117 is secured to container portion 102. The method of filling container 102 through dip tube structure 160 and subsequently assembling pump 12 on container 102 is described in detail in U.S. Pat. No. 5,305,810, the disclosure of which is incorporated herein by reference. The configuration shown in FIG. 12 incorporating an integrally molded dip tube structure 160 is particularly useful for viscous products, for which there may be difficulty in priming the pump, as described in U.S. Pat. No. 5,305,810. The container 101, of course, may also be filled through the bottom, as described hereinabove, after insertion and securement of the pump 112 onto container portion 102. Pump 112 may be secured to container portion 102 either by a conventional snap or interference fit between the exterior of pump 102 and the retaining wall 110 or dip tube structure 160, or by ultrasonic welding using energy directors, as discussed hereinabove.

Figure 13:
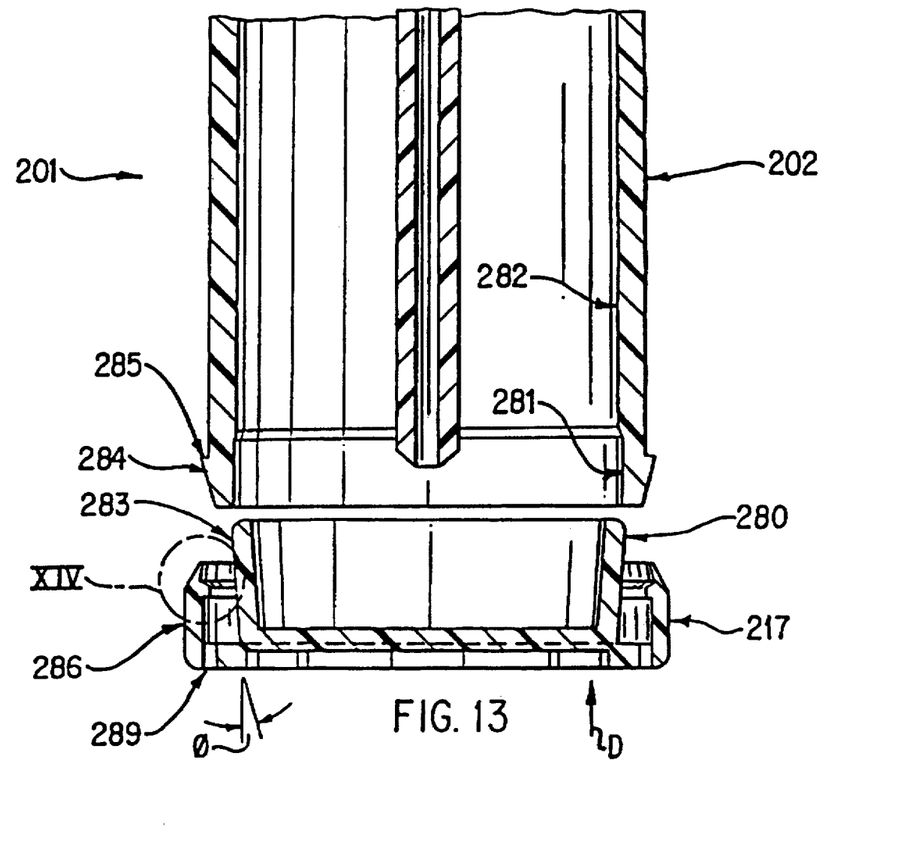
FIG. 13 is a cross-sectional detail view of the bottom of an alternative embodiment of the dispensing package of the present invention, in an unassembled exploded view.
Figure 14:
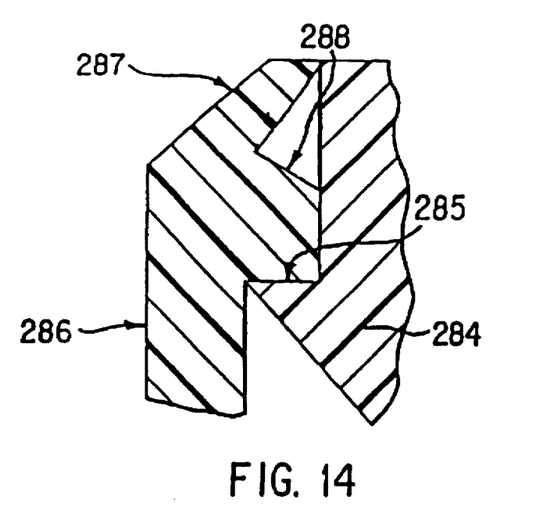
FIG. 14 is a detail cross-sectional view of the rim seal of the bottom portion of the dispensing package of the embodiment of FIG. 13.

FIGS. 13 and 14 show an alternative embodiment container 201 of the bottom portion and container portion used in the present invention. The bottom portion 217 in the embodiment of FIGS. 13 and 14 is particularly effective in ensuring a leakproof seal at the bottom of container portion 202. Bottom portion 217 includes an interior piston portion 280, which slides in and seals against an interior sealing surface 281 of container portion 202. Interior sealing surface 281 can be slightly inset from interior surface 282 of container portion 202. Interior piston portion 280 includes a tapered sealing surface 283 extending at an angle $\phi$ from vertical. Tapered sealing surface 283 ensures a good leakproof seal of interior piston portion 280 against interior sealing surface 281. Container portion 202 also includes at its lower end, angled snap rim 284 extending around the entire circumference of container portion 202. Snap rim 284 includes an upper snap surface 285. Bottom portion 217 includes an exterior snap flange 286 which is used to secure and seal bottom portion 217 to container portion 202. Snap flange 286 includes, at its upper end, an angled snap lip 287 extending around the entire circumference of snap flange 286, and a series of snap fingers 288 spaced circumferentially around the interior of snap flange 286. Snap fingers 288 engage with snap surface 285 on snap rim 284 to thereby secure bottom portion 217 to container portion 202. Snap lip 287 generally contacts the exterior of container portion 202 to thereby ensure a good leakproof seal of bottom portion 217 to container portion 202. Bottom portion 217 may include openings 289 to allows proper molding of snap fingers 288 on snap flange 286.

During assembly, bottom portion 217 is slid onto container portion 202 in direction D. As bottom portion slides in direction D, sealing surfaces 281 and 283 engage and seal against one another. As bottom portion 217 moves further in direction D, first snap lip 287 and then snap fingers 288 move around snap rim 284. After snap fingers 288 move around snap rim 284, snap fingers 288 snap into engagement with snap surface 285 to secure bottom portion 217 to container portion 202, and snap lip 287 snaps into engagement with the exterior of container portion 202. As a result, bottom portion 217 is sealed and secured to container portion 202.

Figure 15:
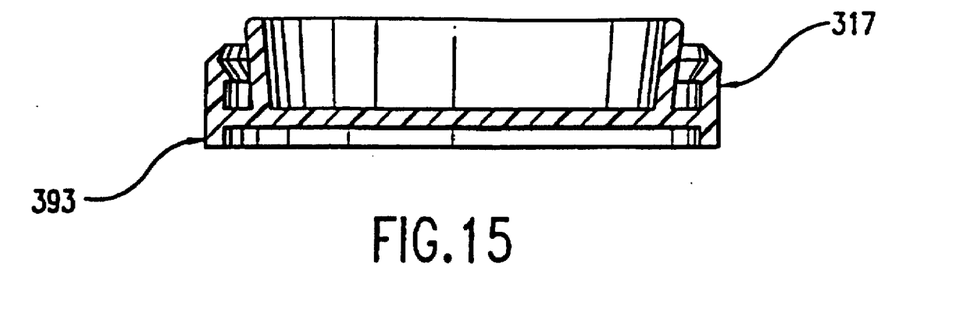
FIG. 15 is a cross-sectional view of an alternative embodiment of the bottom portion of the present invention.
Figure 16:
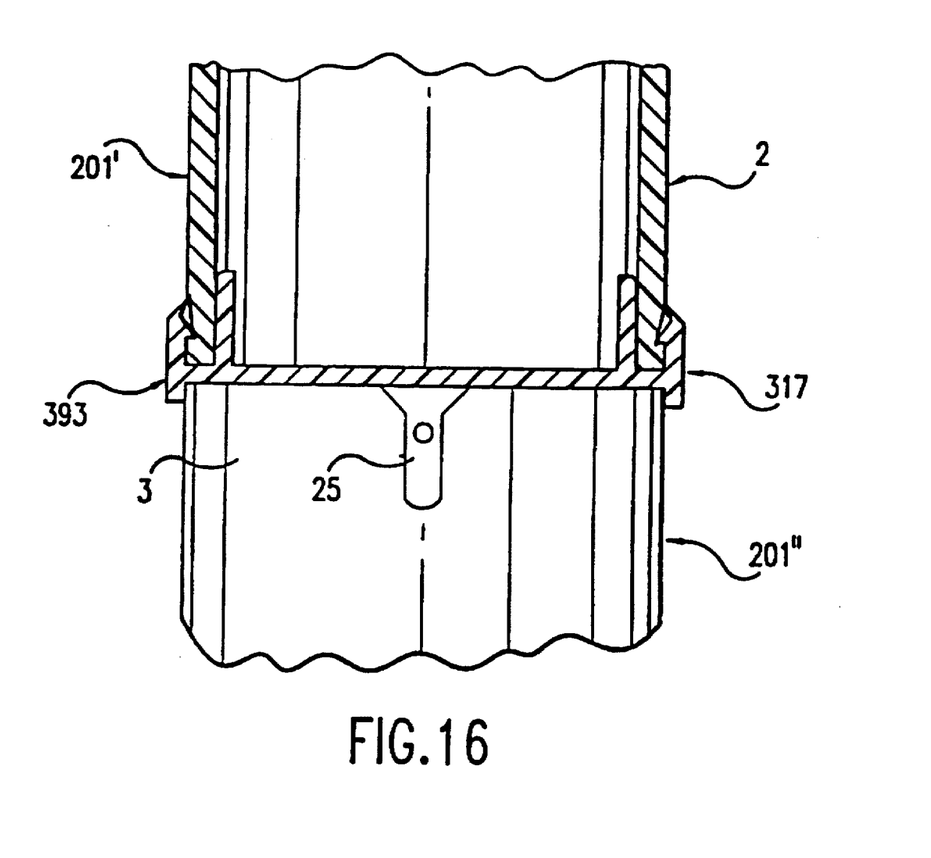
FIG. 16 is a detail view of the embodiment of FIG. 15, showing the manner in which stacking is accomplished.

FIGS. 15 and 16 show an alternative configuration of the bottom portion which allows the container to be easily stacked. Bottom portion 317 in the embodiment of FIGS. 15 and 16 has a stacking flange 393 which is shaped so as to receive upstanding wall 3, as shown in FIG. 16. Accordingly, as shown in FIG. 16, a first container 201' may be easily stacked and secured upon a second container 201".

Figure 17:
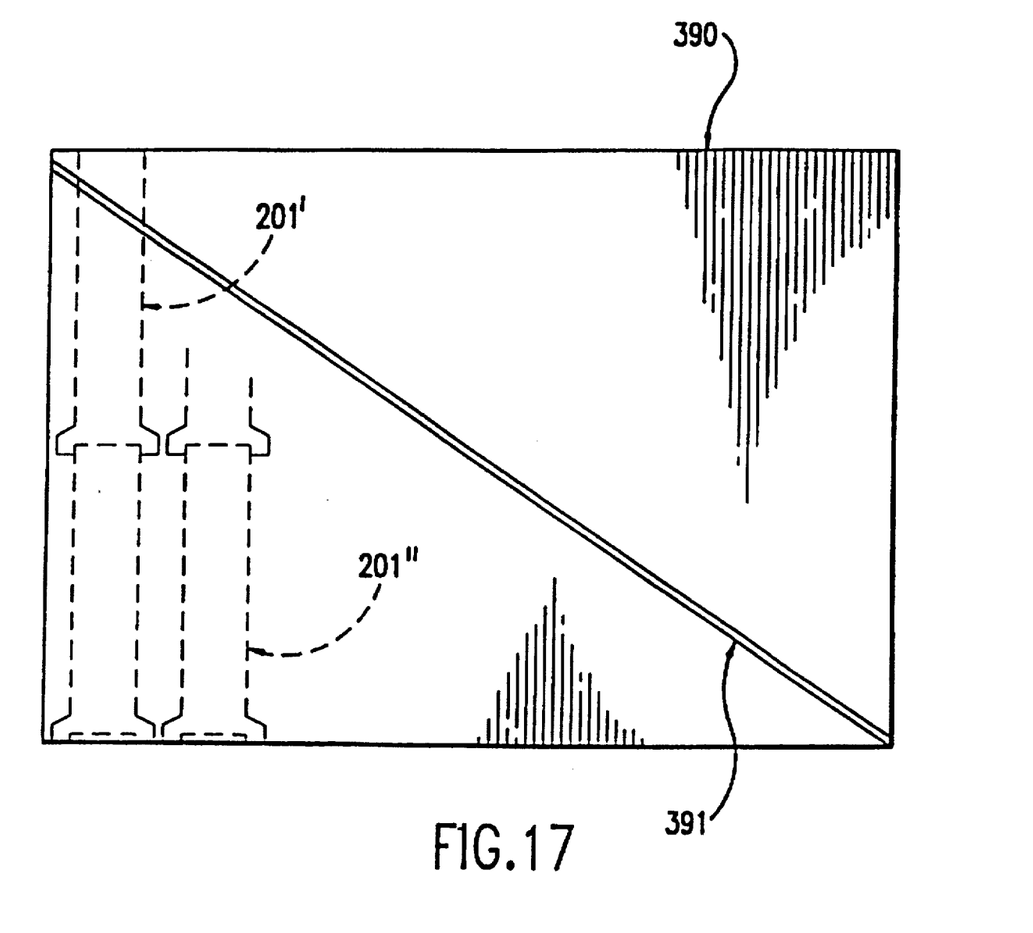
FIG. 17 is a side view of a package used with the embodiment of FIGS. 15–16.

FIG. 17 shows an advantageous packaging arrangement for packaging and shipping stacked containers 201', 201" of the type shown in FIGS. 15 and 16. Package 390 is wrapped around a series of stacked containers 201', 201" and includes a tear-strip 391 for unwrapping package 390 and gaining access to containers 201', 201".

I claim:

1. A dispensing package comprising:
an integrally formed container portion-comprising:
a lower portion, a dip tube structure and a retaining wall, the lower portion containing an open lower end, the retaining wall comprising a retaining opening, the dip tube structure being integrally molded with the retaining wall;
a pump structure, a circumferential outer surface of the pump structure being formed to be retained in the retaining opening and sealed to the retaining wall; and
a bottom portion, the bottom portion being formed separate from the container portion, the bottom portion being formed to be secured to the lower end and sealed to the lower end, whereby the bottom portion can be sealed to the lower end and the container portion can be filled with a liquid product, to seal the liquid product within the container portion.

2. The dispensing package of claim 1, further comprising:
a shoulder on the package for supporting the package during an assembly operation and a filling operation.

3. The dispensing package of claim 1, further comprising:
an energy director for providing a seal between the retaining wall and the pump structure.

4. The dispensing package of claim 1, further comprising:
an energy director for providing a seal between the bottom portion and the container portion.

5. The dispensing package of claim 1, further comprising:
angled tabs on the lower end of the container portion, the angled tabs cooperating with a horizontal portion on the bottom portion, to thereby ensure that the bottom portion is secured horizontally to the container portion.

6. The dispensing package of claim 1, wherein:
the dip tube structure comprises a vent hole.

7. The dispensing package of claim 1, further comprising:
an actuator retained upon the pump structure.

8. The dispensing package of claim 7, further comprising:
a spring mounted between the actuator portion and the retaining wall.

9. The dispensing package of claim 1, wherein:
the integrally formed container portion comprises an upstanding wall portion.

10. The dispensing package of claim 9, wherein:
the upstanding wall portion comprises a groove for retaining and sealing a nozzle on the actuator portion, the retaining wall further comprising a limit stop for preventing downward movement of the actuator portion when the nozzle is retained in the groove.

11. The dispensing package of claim 9, wherein:
the upstanding wall portion comprises a removable tab covering a dispensing opening in the upstanding wall.

12. The dispensing package of claim 9, wherein:
the bottom portion comprises a stacking flange engageable with an upstanding wall portion of another dispensing package.

13. The dispensing package of claim 1, wherein:
the bottom portion comprises a bottom portion inner sealing surface sealable against an interior of the container portion, the bottom portion further comprising an outer retaining portion engageable with the retaining rim.

14. The dispensing package of claim 13, wherein:
the bottom portion inner sealing surface is tapered.

15. The dispensing package of claim 13, wherein:
the outer retaining portion comprises snap fingers engaging the retaining rim.

16. The dispensing package of claim 15, wherein:
the outer retaining portion comprises a snap lip.

17. A dispensing package comprising:
an integrally formed container portion comprising:
a lower portion and a retaining wall, the lower portion containing an open lower end and a retaining rim, the retaining wall comprising a retaining opening;
a pump structure, a circumferential outer surface of the pump structure being formed to be retained in the retaining opening and sealed to the retaining wall; and
a bottom portion, the bottom portion being formed separate from the container portion, the bottom portion being formed to be secured to the lower end and sealed to the lower end, the bottom portion comprising a bottom portion inner sealing surface, the bottom portion inner sealing surface comprising an outer circumference, the entire outer circumference sealing against an interior of the container portion to seal a liquid product within the container portion when the bottom portion is secured to the lower end, the bottom portion further comprising an outer retaining portion engageable with the retaining rim, whereby the container portion can be filled with the liquid product through the lower end and the bottom portion sealed to the lower end.

18. The dispensing package of claim 17, wherein:
the bottom portion inner sealing surface is tapered.

19. The dispensing package of claim 17, wherein:
the bottom portion further comprises an interior piston portion, the interior piston portion comprising the bottom portion inner sealing surface.

20. The dispensing package of claim 17, wherein:
the bottom portion inner sealing surface is tapered.

21. The dispensing package of claim 17, wherein:
the outer retaining portion comprises a snap lip extending around an entire circumference of the outer retaining portion and sealing against an exterior of the lower portion of the integrally formed container portion.

22. The dispensing package of claim 17, further comprising:
a shoulder on the package for supporting the package during an assembly operation and a filling operation.

23. The dispensing package of claim 17, wherein:
the integrally formed container portion comprises an upstanding wall portion.

24. The dispensing package of claim 23, wherein:
the bottom portion comprises a stacking flange engageable with an upstanding wall portion of another dispensing package.

25. The dispensing package of claim 17, further comprising:
an actuator retained upon the pump structure.

26. The dispensing package of claim 25, further comprising:
a spring mounted between the actuator portion and the retaining wall.

27. The dispensing package of claim 17, wherein:
the lower portion of the integrally formed container portion comprises an interior sealing surface and an interior surface, the bottom portion inner sealing surface sealing against the interior sealing surface.

28. The dispensing package of claim 27, wherein:

the interior sealing surface is inset from the interior surface.

29. The dispensing package of claim 17, wherein:

the integrally formed container portion comprises an upstanding wall portion.

30. The dispensing package of claim 29, wherein:

the upstanding wall portion comprises a groove for retaining and sealing a nozzle on the actuator portion, the retaining wall further comprising a limit stop for preventing downward movement of the actuator portion when the nozzle is retained in the groove.

31. The dispensing package of claim 29, wherein:

the upstanding wall portion comprises a removable tab covering a dispensing opening in the upstanding wall.

32. The dispensing package of claim 17, further comprising:

an actuator retained upon the pump structure.

33. The dispensing package of claim 32, further comprising:

a spring mounted between the actuator portion and the retaining wall.

34. A dispensing package comprising:

an integrally formed container portion comprising:
a lower portion and a retaining wall, the lower portion containing an open lower end and a retaining rim, the retaining wall comprising a retaining opening;
a pump structure, a circumferential outer surface of the pump structure being formed to be retained in the retaining opening and sealed to the retaining wall; and
a bottom portion, the bottom portion being formed separate from the container portion, the bottom portion being formed to be secured to the lower end and sealed to the lower end, the bottom portion comprising a bottom portion inner sealing surface sealable against an interior of the container portion, the bottom portion further comprising an outer retaining portion engageable with the retaining rim, whereby the container portion can be filled with a liquid product through the lower end and the bottom portion sealed to the lower end to seal the liquid product within the container portion, the outer retaining portion comprising snap fingers engaging the retaining rim.

35. The dispensing package of claim 34, wherein:

the bottom portion further comprises an interior piston portion, the interior piston portion comprising the bottom portion inner sealing surface.

36. The dispensing package of claim 34, wherein:

the bottom portion inner sealing surface is tapered.

37. The dispensing package of claim 34, wherein:

the outer retaining portion comprises a snap lip.

38. The dispensing package of claim 37, wherein:

the snap lip extends around an entire circumference of the outer retaining portion and seals against an exterior of the lower portion of the integrally formed container portion.

39. The dispensing package of claim 34, wherein:

the lower portion of the integrally formed container portion comprises an interior sealing surface and an interior surface, the bottom portion inner sealing surface sealing against the interior sealing surface.

40. The dispensing package of claim 39, wherein:

the interior sealing surface is inset from the interior surface.

* * * * *